(12) United States Patent
Edelhäuser et al.

(10) Patent No.: US 11,881,763 B2
(45) Date of Patent: Jan. 23, 2024

(54) CONTROL DEVICE AND METHOD FOR DISCHARGING A DC LINK CAPACITOR, POWER CONVERTER, AND VEHICLE

(71) Applicant: Valeo Siemens eAutomotive Germany GmbH, Erlangen (DE)

(72) Inventors: Rainer Edelhäuser, Nuremberg (DE); Philipp Erdtmann, Eckental (DE); Thomas Götze, Höchstadt/Aisch (DE); Philip Hubner, Erlangen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 564 days.

(21) Appl. No.: 16/973,548

(22) PCT Filed: Jun. 6, 2019

(86) PCT No.: PCT/EP2019/064763
§ 371 (c)(1),
(2) Date: Dec. 9, 2020

(87) PCT Pub. No.: WO2020/001951
PCT Pub. Date: Jan. 2, 2020

(65) Prior Publication Data
US 2021/0257903 A1   Aug. 19, 2021

(30) Foreign Application Priority Data

Jun. 26, 2018   (DE) ..................... 10 2018 115 295.7

(51) Int. Cl.
*H02P 1/00* (2006.01)
*H02P 1/28* (2006.01)
(Continued)

(52) U.S. Cl.
CPC ............. *H02M 1/322* (2021.05); *B60L 15/04* (2013.01); *H02M 1/08* (2013.01); *B60K 6/28* (2013.01);
(Continued)

(58) Field of Classification Search
CPC .......... H02M 1/322; H02M 1/08; B60L 15/04
(Continued)

(56) References Cited

U.S. PATENT DOCUMENTS 5,619,107 A   4/1997   Shinohara et al.
9,728,986 B2   8/2017   Bernardon et al.
(Continued)

FOREIGN PATENT DOCUMENTS

CN   102437771 A   5/2012
CN   206481057 U   9/2017
(Continued)

OTHER PUBLICATIONS

PCT/ISA/210, "International Search Report for International Application No. PCT/EP2019/064763," dated Aug. 20, 2019.

*Primary Examiner* — Erick D Glass
(74) *Attorney, Agent, or Firm* — Manabu Kanesaka

(57) ABSTRACT

In a control device for discharging a DC link capacitor by means of a discharging device including a load resistor and a switch element connected in series with the load resistor, the control device includes a generator unit, which is configured to generate a pulse width-modulated actuation signal for the switch element with an ascertained duty cycle, and a control unit, which is configured to ascertain the duty cycle in such a way that, in the time average, a desired discharge current flows through the load resistor.

12 Claims, 2 Drawing Sheets

(51) Int. Cl.
  *H02P 3/00*   (2006.01)
  *H02P 7/06*   (2006.01)
  *H02M 1/32*   (2007.01)
  *B60L 15/04*  (2006.01)
  *H02M 1/08*   (2006.01)
  *B60K 6/28*       (2007.10)
  *H02P 27/08*      (2006.01)

(52) U.S. Cl.
  CPC ....... *B60Y 2200/91* (2013.01); *B60Y 2200/92* (2013.01); *H02P 27/08* (2013.01)

(58) Field of Classification Search
  USPC .......................................................... 318/504
  See application file for complete search history.

(56) References Cited

U.S. PATENT DOCUMENTS

| | | | | |
|---|---|---|---|---|
| 2007/0097718 A1* | 5/2007 | Nahar | ................... | G01K 7/425 |
| | | | | 374/E7.043 |
| 2011/0031939 A1 | 2/2011 | Funaba et al. | | |
| 2012/0274401 A1* | 11/2012 | Watanabe | ........... | H01L 29/7869 |
| | | | | 330/252 |
| 2015/0102672 A1* | 4/2015 | Matsumoto | ............. | H02M 1/08 |
| | | | | 307/31 |
| 2015/0143885 A1* | 5/2015 | Konig | ................... | G01M 15/02 |
| | | | | 73/115.01 |
| 2016/0146155 A1* | 5/2016 | Stuart | ................... | F04D 27/002 |
| | | | | 29/889.2 |
| 2016/0149514 A1* | 5/2016 | Faschang | ............... | H02M 7/537 |
| | | | | 363/131 |
| 2017/0077730 A1* | 3/2017 | Berg | ................. | H02J 7/007182 |
| 2018/0079315 A1 | 3/2018 | Yang et al. | | |
| 2020/0189410 A1* | 6/2020 | Eberlein | ............... | H02M 7/537 |

FOREIGN PATENT DOCUMENTS

| | | |
|---|---|---|
| DE | 102012203073 A1 | 8/2013 |
| DE | 102013106854 A1 | 1/2014 |
| DE | 102013224884 A1 | 6/2015 |

* cited by examiner

CONTROL DEVICE AND METHOD FOR DISCHARGING A DC LINK CAPACITOR, POWER CONVERTER, AND VEHICLE

RELATED APPLICATIONS

The present application is National Phase of International Application No. PCT/EP2019/064763 filed Jun. 6, 2019, and claims priority from German Application No. DE 10 2018 115 295.7 filed Jun. 26, 2018, the disclosure of which is hereby incorporated by reference herein in its entirety.

The present invention relates to a control device for discharging a DC link capacitor by means of a discharging device comprising a load resistor and a switch element connected in series with the load resistor.

In addition, the invention relates to a power converter, to a vehicle, and to a method for discharging a DC link capacitor.

DC link capacitors store a DC voltage, which is converted, for example, in a power converter into a polyphase alternating current for supplying an electric motor. When a discharge event is present, for example when the electric motor is shut off, in the event of a fault or an accident of a vehicle comprising the power converter, the goal is to swiftly discharge the DC link capacitor to a non-hazardous voltage to ensure electrical safety. When using a discharging device including a load resistor and a switch element that is connected in series with the load resistor, the switch element is closed when a discharge event is present, to convert energy stored in the DC link capacitor into heat.

Such a device for discharging a DC link capacitor in a voltage converter including an electric load and a discharge regulator is known from DE 10 2013 224 884 A1. The discharge regulator is designed to discharge the DC link capacitor by way of the electric load using a predetermined discharge current. The discharge regulator enables an at least approximately constant discharge current and comprises an operational amplifier, which actuates a power transistor in such a way that the discharge takes place at the predetermined discharge current.

In this way, an approximately constant power consumption of the load resistor can be achieved. The power transistor or the switch element, however, is operated in the active range thereof and itself converts a considerable portion of the stored energy into heat. The uniform power consumption by the load resistor is thus achieved by a variable power consumption of the switch element. The switch element has to be designed for an accordingly high power consumption, which increases the component complexity.

It is therefore the object of the invention to provide an option for discharging a DC link capacitor which is less complex.

This object is achieved according to the invention by a control device of the type mentioned at the outset, comprising a generator unit, which is configured to generate a pulse width-modulated actuation signal for the switch element with an ascertained duty cycle, and a control unit, which is configured to ascertain the duty cycle in such a way that, in the time average, a desired discharge current flows through the load resistor.

The invention is based on the deliberation of only operating the switch element in the switch mode by way of the pulse width-modulated actuation signal, wherein a clocked current that flows through the load resistor is predefined based on the duty cycle. In this way, on the one hand, the switch element can advantageously be designed for only the switch mode, and not for active operation, with respect to the power loss thereof, and, on the other hand, the load resistor can be designed based on a power loss arising thereon in the time average.

The expression "in the time average" within the meaning of the present invention shall be understood to mean a moving average across several periods of the pulse width-modulated actuation signal or a weighted average, so that the averaged value essentially only compensates for clocking by way of the pulse width modulation. In the process, a period duration of the actuation signal is expediently selected so as to be below a thermal time constant of the load resistor, if necessary additionally taking cooling conditions at the load resistor into consideration. This load resistor, due to the thermal capacity thereof, averages a thermal power consumption caused by the current.

It is preferred that the control unit is configured to ascertain the duty cycle in such a way that the discharge current causes a power consumption by the load resistor which is substantially constant in the time average. The load resistor thus only has to enable maximum power consumption corresponding to the constant discharge capacity. Compared to a continuous current through the load resistor, the load resistor is therefore not to be designed to consume high, temporarily occurring peak power levels or peak currents, and can consequently be selected to be smaller and less expensive. Due to the thermal capacity of the load resistor, the current flowing during an on-time of the actuation signal can nonetheless flow without damage to the load resistor, since the duration of the on-time is small compared to the thermal time constant of the load resistor. The power consumption can be determined based on a maximum energy level stored in the DC link capacitor and a predefined discharge time.

In the control device according to the invention, it can particularly advantageously be provided that the control unit is configured to ascertain the duty cycle as a function of a piece of voltage information that describes a DC link voltage dropping across the DC link capacitor. In the process, a larger discharge current, that is, a larger duty cycle of the actuation signal, is typically predefined with decreasing DC link voltage.

According to a first preferred embodiment, the control unit comprises a target value ascertainment unit, which is configured to ascertain a discharge current target value as a function of the piece of voltage information. The discharge current target value is preferably selected in such a way that the quadratic dependence of the power consumption of the load resistor is compensated for by the voltage dropping across it ($P=U^2/R$). Optimal compensation arises when the discharge current target value corresponds to the quotient of the power consumption of the load resistor and the DC link voltage.

The target value ascertainment unit can be configured to ascertain the discharge current target value as a function of the inverse, in particular a negative value, of the DC link voltage. The use of the negative value approximates an inverse in the form of a reciprocal value of the DC link voltage, which allows a simpler implementation in terms of the circuitry. In other words, the negative value reflects the curve of the DC link voltage. The target value ascertainment unit is advantageously furthermore configured to ascertain the discharge current target value as the sum of the inverse and an offset.

According to a second preferred embodiment, the control unit is configured to calculate the duty cycle as a ratio of the product of the resistance value of the load resistor and the desired power consumption thereof to the DC link voltage squared. The compensation of the quadratic voltage dependence in this case takes place by computation. Furthermore, the duty cycle can thus be directly calculated.

It can furthermore be provided in the case of the control device according to the invention that the control unit is configured to ascertain the duty cycle as a function of a piece of current information that describes a time average of a current flowing through the load resistor. The control device conditions the clocked current through the load resistor through the ascertainment of the piece of current information. For this purpose, the control device can comprise a low pass unit, which is configured to generate the piece of current information from a current measurement value describing the instantaneous current through the load resistor. In other words, the low pass unit conditions the current measurement value clocked by the pulse width-modulated actuation signal. The low pass unit can be an RC circuit, a hold element, or another smoothing or averaging circuit.

So as to allow the discharge process to be regulated, the control device can comprise a controller, which is configured to ascertain the duty cycle as a function of a deviation of the time average of the current from the discharge current target value. The controller may have P behavior, or PI behavior, or PID behavior. In the process, a trend of the current flowing in the time average to decrease, in particular with dropping voltage, is typically compensated for by an accordingly greater duty cycle, when the discharge current target value remains the same. Taking the current flowing through the load resistor into consideration makes it possible, in particular, to control the discharge current in a manner which is largely independent of manufacturing-related variations of the resistance value of the load resistor. This advantageously reduces the precision requirements with regard to the load resistor.

In the case of the control device according to the invention, the control unit is preferably designed as an analog circuit. With respect to automotive application purposes, this has the advantage that standard components can be resorted to for implementing the control unit, thereby minimizing a certification complexity with respect to an Automotive Safety Integrity Level (ASIL) to be adhered to. As an alternative, the control unit can be designed as a microprocessor. This applies in particular when the discharge current is calculated according to the above-described second embodiment, in which in particular the ascertainment of the discharge current target value and of the piece of current information is dispensed with. Nevertheless, it is conceivable to implement this calculation by way of the analog circuit.

The invention additionally relates to a power converter, comprising a DC link capacitor, a discharging device by means of which the DC link capacitor can be discharged and which comprises a load resistor and a switch element connected in series with the load resistor, and a control device according to the invention actuating the discharging device.

The invention furthermore relates to a vehicle, in particular an electric vehicle or a hybrid vehicle, comprising an electric motor for driving the vehicle, and a power converter according to the invention, which is configured to supply the electric motor with electricity.

Finally, the invention relates to a method for discharging a DC link capacitor by way of a discharging device comprising a load resistor and a switch element connected in series with the load resistor, wherein a pulse width-modulated actuation signal is generated for the switch element with an ascertained duty cycle, and the duty cycle is ascertained in such a way that a desired discharge current flows through the load resistor in the time average.

All embodiments for the control device according to the invention can be applied analogously to the power converter according to the invention, to the vehicle according to the invention, and to the method according to the invention, so that the aforementioned advantages can also be achieved thereby.

Further advantages and details of the present invention will be apparent from the exemplary embodiments described hereafter and the drawings. These are schematic illustrations. In the drawings.

Figure 1:
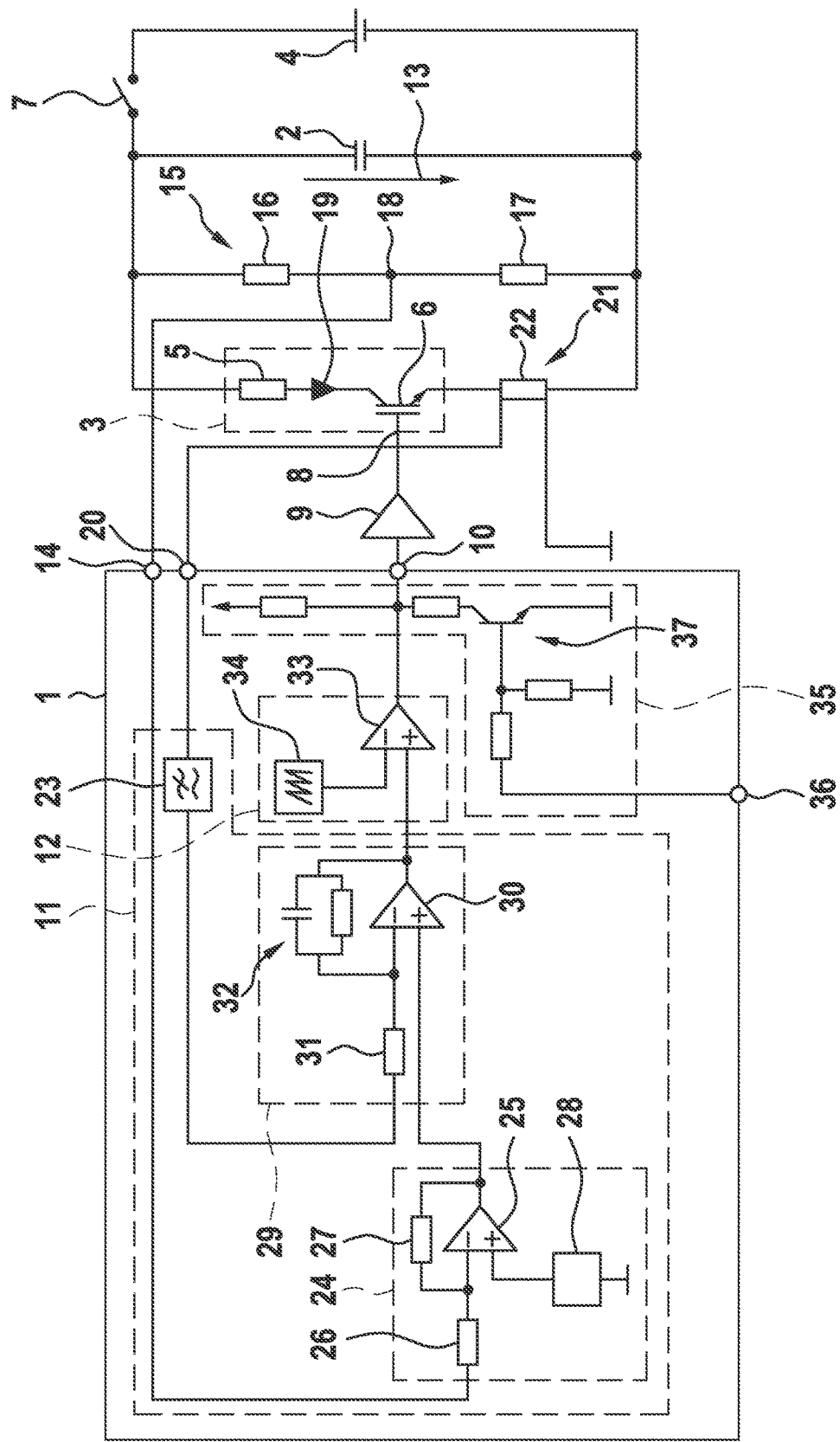
FIG. 1 shows a circuit diagram of a first exemplary embodiment of a control device according to the invention.

FIG. 1 shows a circuit diagram of a first exemplary embodiment of a control device 1 for discharging a DC link capacitor 2 by means of a discharging device 3.

The DC link capacitor 2 is supplied with electricity by a DC voltage source 4 and can, in particular, be connected in parallel to a power unit of a power inverter to smooth transient currents. The discharging device 3 is used to actively discharge the DC link capacitor 2 within a predefined time of, for example, two seconds to below a predefined voltage threshold value of, for example, 60 V, when a discharge event is present. For this purpose, the discharging device 3 comprises a load resistor 5 and a switch element 6, in the form of an electronic switch, for example an IGBT or a power MOSFET, connected in series therewith. For discharging, the DC link capacitor 2 is typically disconnected from the DC voltage source 4 by means of a switch device 7 in a one- or two-pole manner.

The discharge process of the DC link capacitor 2 is controlled by the control device 1. For this purpose, a control terminal 8 of the discharging device 3 or of the switch element 6 is connected via a driver unit 9 to an output 10 of the control device 1. The driver unit 9 amplifies an actuation signal at the output 10 in such a way that the switch element 6 is either conducting, so that a current 19 discharging the DC link capacitor 2 flows through the load resistor 5, or non-conducting.

The control device 1 comprises a control unit 11 and a generator unit 12, which is configured to generate a pulse width-modulated actuation signal for the switch element at the output 10 with a duty cycle that is ascertained by the control unit 11.

The control unit 11 is configured in the process to ascertain the duty cycle in such a way that a discharge current flowing in the time average through the load resistor 5 causes a substantially constant electrical power consumption by the load resistor 5. This enables a substantially constant electric and thermal load of the load resistor 5. At the same time, the switch element 6 is also only operated in conducting or blocking mode, thus outside an active or amplifying range. In this way, the power consumption of the switch element 6 is minimized so as to be able to design it for considerably lower power requirements, compared to an in-phase control of the current 19 flowing through the load resistor 5.

The control unit 11 comprises a target value ascertainment unit 24, which is configured to ascertain a discharge current target value as a function of a piece of voltage information describing a DC circuit voltage 13 dropping across the DC link capacitor. For this purpose, the control device 1 comprises a first input 14, via which it receives the piece of voltage information. In the present exemplary embodiment, the first input 14 is connected to a voltage detection device 15 for this purpose. This is designed as a voltage divider, which is connected in parallel to the DC link capacitor 2 and the resistance elements 16, 17 of which divide the high DC link voltage 13 into a voltage proportional thereto at a tap 18 of a voltage divider. In the process, the resistance element 16 can implement a resistance of 500 kΩ, and the resistance element 17 can implement a resistance of 820Ω, for example, wherein the resistance elements 16, 17 are each formed by one resistance component or a plurality of interconnected resistance components.

So as to ascertain the current target value, the target value ascertainment unit 24 receives the piece of voltage information provided at the first input 14. The target value ascertainment unit 24 comprises an operational amplifier 25, which inverts the DC link voltage 13 described by the piece of voltage information, that is, finds the negative value thereof, and adds a fixed offset to an inverse of the DC link voltage 13 thus obtained. For this purpose, the operational amplifier 25 is connected by means of two resistors 26, 27, each having a resistance value of 20 kΩ, for example, at the negative input as an inverting amplifier, and to a constant voltage source 28 at the positive input. In this way, a discharge of the DC link capacitor 2 takes place in such a way that the current 19 through the load resistor 5 is selected in such a way that the quadratic dependence of the power consumed by the load resistor 5 is largely compensated for by the voltage dropping thereacross.

The control unit 11 is additionally configured to ascertain the duty cycle as a function of a piece of current information describing a time average of the current 19 through the load resistor 5. So as to ascertain the piece of current information, the control device 1 receives a current measurement value via a second input 20, which is connected to a current detection device 21 connected in series with the discharging device 3. In the present exemplary embodiment, this is formed by a shunt resistor 22. Since the current measurement value describes the current 19 clocked by the switching of the switch element 6, a low pass unit 23, for example in the form of an RC circuit, is connected downstream of the second input 20. This conditions the current measurement value in such a way that the piece of current information is provided proportionally to a short-term moving or weighted average of the current 19.

So as to regulate the duty cycle, the control unit 11 comprises a controller 29, which is configured to ascertain the duty cycle as a function of a deviation of the time average of the current 19 from the discharge current target value. In the present exemplary embodiment, the controller 29 achieves the ascertainment of the deviation and PI control behavior. For this purpose, the controller 29 comprises an operational amplifier 30, which is provided with two impedances 31, 32 at the negative input thereof, and with the output signal of the target value ascertainment unit 24 at the positive output thereof. The implementation of the impedances 31, 32 in FIG. 1 is purely by way of example. The impedance 31 is 20 kΩ, for example, and the impedance 32 is formed, for example, by a resistor having a resistance value of 100 kΩ parallel to a capacitance of 1 nF. As an alternative, the controller 29 has P control behavior or PID control behavior.

As an alternative, the output signal of the target value ascertainment unit 24 and the piece of current information are initially supplied to a subtractor unit (not shown), for example a differential amplifier or an operational amplifier interconnected as a subtractor, of the controller 29, and the output signal of the subtractor unit is supplied to the negative input of the operational amplifier 30. In the process, the positive input of the operational amplifier 30 is connected to ground potential.

The output signal of the controller 29 is supplied to the generator unit 12. This comprises a comparator 33, having a positive input that receives the output signal of the controller 29, and having a negative input that is connected to a signal generator 34, which generates, for example, saw tooth or triangular voltage for generating the pulse width modulated output signal at the output 10.

The control device 1 additionally comprises a deactivation unit 35, by means of which the output of the actuation signal at the output 10 can be deactivated as a function of a deactuation signal at a third input 36 of the control device 1. For this purpose, the deactivation unit 35 comprises a transistor circuit 37, by means of which the output 10 can be switched to ground potential via a resistor as a function of the deactuation signal, so that the switch element 6 of the discharging device 3 blocks permanently, and no discharge of the DC circuit capacitor 2 takes place, in particular during normal operation. When the transistor circuit 37 blocks, the actuation signal is allowed to pass to the output 10.

In the present exemplary embodiment, both the control unit 11 and the generator unit 12 are designed as analog circuits. As an alternative, the control unit 11 and/or the generator unit 12 can also be designed as microcontrollers.

Figure 2:
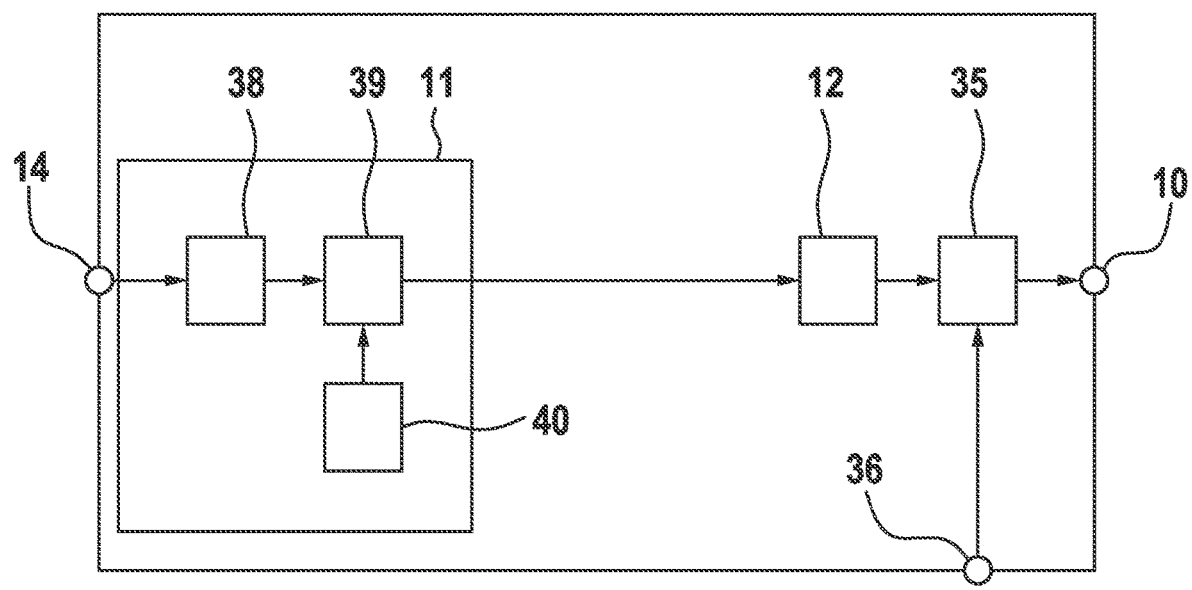
FIG. 2 shows a block diagram of a second exemplary embodiment of the control device.

FIG. 2 shows a block diagram of a second exemplary embodiment of a control device 1, which corresponds to the above-described exemplary embodiment with the exception of the changes described below, and in which identical or like-acting components are denoted by identical reference numerals.

The control unit 11 is configured here to calculate the duty cycle directly from the ratio of the product of the resistance value of the load resistor 5 and the desired power consumption thereof to the DC link voltage 13 squared. For this purpose, the control unit 11 comprises a quadrator unit 38, which squares the DC link voltage 13 obtained at the first input 14 from the piece of voltage information. The output signal of the quadrator unit 38 is fed to a divider unit 39, which, from a memory unit 40, receives a signal that describes the product of the load resistor 5 and the desired power consumption, and divides it by the output signal of the quadrator unit 28. The output signal of the divider unit 39 then describes the duty cycle, which causes a substantially constant power consumption of the load resistor 5 and is fed to the generator unit 12. Expressed by way of a formula, the following thus results from the resistance R and the desired power consumption P for the duty cycle D:

$$D = \frac{R \cdot P}{U^2}$$

So as to make the calculation of the duty cycle simple, the control unit 11 and the generator unit 12 are designed as microcontrollers in the second exemplary embodiment, wherein the quadrator unit 38 and the divider unit 39 are implemented by suitable software routines of the microcontroller. As an alternative, it is also possible to implement the quadrator unit 38 and the divider unit 39 by suitable analog calculation circuits.

Figure 3:
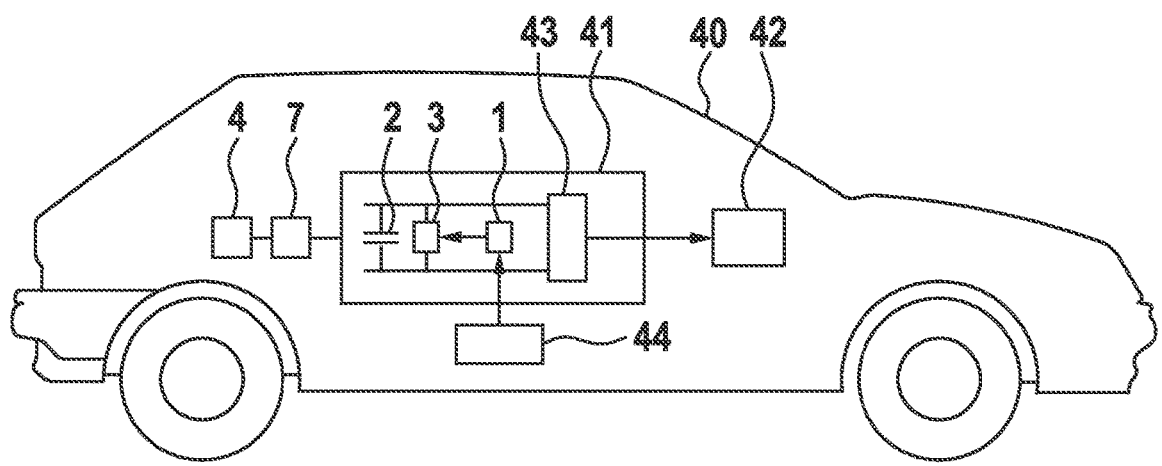
FIG. 3 shows a block diagram of an exemplary embodiment of a vehicle according to the invention, including an exemplary embodiment of a power converter according to the invention.

FIG. 3 shows a block diagram of an exemplary embodiment of a vehicle 40 including an exemplary embodiment of a power converter 41, which is configured to supply electricity to an electric motor 42 for driving the vehicle 40. Identical or like-acting components are denoted by identical reference numerals as in FIGS. 1 and 2.

The power converter 41 comprises a DC link capacitor 2 and a discharging device 3, by means of which the DC link capacitor 2 can be discharged, and a control device 1 according to one of the aforementioned exemplary embodiments which actuates the discharging device 3. For this purpose, the DC link capacitor 2 is supplied by a DC voltage source 4, in the form of a high voltage battery, which is connected to the DC voltage side of the power converter 41 via a switch device 7. The power converter 41 furthermore comprises a driver unit 9, a voltage detection device 15, and a current detection device 21, which are not individually illustrated in FIG. 3 for the sake of clarity.

The DC link capacitor 2 smooths transient currents generated by a power unit 43 of the power converter 41. The power unit 43 converts the DC voltage provided by the DC voltage source 4 into a polyphase, in particular three- or six-phase, alternating current for the electric motor 42 and comprises three or six half bridges, which are connected in parallel to the DC link capacitor 2 and which are each composed of two power semiconductor switch elements, which are connected in series.

The control unit 1 receives the deactuation signal from a control module 44 of the vehicle 40. The control module 44 is configured to ascertain whether a discharge event, for example an accident, an insulation fault, or a shut-off of the vehicle 40 or the electric motor 42 is present. If such a discharge event is present, or if the deactuation signal fails to be present for other reasons, a signal state change of the deactuation signal, or an absence of the deactuation signal, at the input 36 triggers the discharge of the DC link capacitor 2 by means of the discharging device 3.

The invention claimed is:

1. A control device for discharging a DC link capacitor, comprising:
   a discharging device including a load resistor and a switch element connected in series with the load resistor,
   a generator unit, which is connected to the switch element and configured to generate a pulse width-modulated actuation signal for the switch element with an ascertained duty cycle, and
   a control unit, which is connected to the generator unit and configured to ascertain the duty cycle in such a way that, in a time average, a desired discharge current flows through the load resistor,
   wherein the control unit is configured to ascertain the duty cycle as a function of a piece of voltage information that describes a DC link voltage dropping across the DC link capacitor, and
   wherein the duty cycle of the actuation signal is ascertained to increase with decreasing the DC link voltage.

2. The control device according to claim 1, wherein the control unit is configured to ascertain the duty cycle in such a way that the discharge current causes a power consumption by the load resistor which is substantially constant in the time average.

3. The control device according to claim 1, wherein the control unit comprises a target value ascertainment unit, which is configured to ascertain a discharge current target value as a function of the piece of voltage information.

4. The control device according to claim 3, wherein the target value ascertainment unit is configured to ascertain the discharge current target value as a function of an inverse of the DC link voltage.

5. The control device according to claim 4, wherein the target value ascertainment unit is configured to ascertain the discharge current target value as a sum of the inverse and an offset.

6. The control device according to claim 3, wherein the control unit comprises a controller, which is configured to ascertain the duty cycle as a function of a deviation of the time average of the current from a discharge current target value.

7. The control device according to claim 1, wherein the control unit is configured to calculate the duty cycle as a ratio of a product of the resistance value of the load resistor and the desired power consumption thereof to the DC link voltage squared.

8. A power converter, comprising the DC link capacitor, and the discharging device by means of which the DC link capacitor can be discharged and which comprises the load resistor and the switch element connected in series with the load resistor, and the control device according to claim 1 actuating the discharging device.

9. A vehicle, comprising an electric motor for driving the vehicle and the power converter according to claim 8, which is configured to supply the electric motor with electricity.

10. A control device for discharging a DC link capacitor, comprising:
    a discharge device including a load resistor and a switch element connected in series with the load resistor,
    a generator unit, which is connected to the switch element and configured to generate a pulse width-modulated actuation signal for the switch element with an ascertained duty cycle, and
    a control unit, which is connected to the generator unit and configured to ascertain the duty cycle in such a way that, in a time average, a desired discharge current flows through the load resistor,
    wherein the control unit is configured to ascertain the duty cycle as a function of a piece of current information that describes a time average of a current flowing through the load resistor.

11. The control device according to claim 10, further comprising a low pass unit, which is configured to generate the piece of current information from a current measurement value describing the instantaneous current.

12. A control device for discharging a DC link capacitor, comprising:
    a discharge device including a load resistor and a switch element connected in series with the load resistor,
    a generator unit, which is connected to the switch element and configured to generate a pulse width-modulated actuation signal for the switch element with an ascertained duty cycle, and
    a control unit, which is connected to the generator unit and configured to ascertain the duty cycle in such a way that, in a time average, a desired discharge current flows through the load resistor,
    wherein the control unit is designed as an analog circuit or as a microprocessor.

* * * * *